United States Patent [19]

Pleva

[11] Patent Number: 5,503,867
[45] Date of Patent: Apr. 2, 1996

[54] COMMINUTED MEAT PRODUCT CONTAINING GROUND CHERRIES

[76] Inventor: Raymond M. Pleva, 8974 S. Kasson St., Cedar, Mich. 49621

[21] Appl. No.: 402,144

[22] Filed: Mar. 10, 1995

Related U.S. Application Data

[63] Continuation-in-part of Ser. No. 225,435, Apr. 8, 1994, abandoned, which is a continuation of Ser. No. 983,897, Dec. 1, 1992, abandoned.

[51] Int. Cl.$^6$ .............................. A23L 1/314; A23L 1/317
[52] U.S. Cl. ........................................................ 426/646
[58] Field of Search .............................................. 426/646

[56] References Cited

U.S. PATENT DOCUMENTS

| | | |
|---|---|---|
| 3,050,400 | 8/1962 | Poarch et al. . |
| 3,520,701 | 7/1970 | Rendek et al. . |
| 3,652,296 | 3/1972 | Wilkerson, Jr. et al. . |
| 4,504,515 | 8/1985 | Hohenester et al. ............ 426/641 |
| 4,752,495 | 6/1988 | Smith ................................ 426/615 |

FOREIGN PATENT DOCUMENTS 2530423  1/1984  France .

OTHER PUBLICATIONS

"Luau Links among new product ideas offered for today's consumer," *Food Engineering*, Oct. 1986, p. 31.
"Development of Low-Fat Beef Patties With Added Dietary Fibers," Webb Technical Group, Inc., Nov. 20, 1990; 426/646.

*Primary Examiner*—Arthur L. Corbin
*Attorney, Agent, or Firm*—Varnum, Riddering, Schmidt & Howlett

[57] ABSTRACT

A comminuted meat mixture of ground lean beef, pitted and ground uncooked cherries, oat bran, and other ingredients in lesser amounts. A method of making such a mixture is also disclosed.

11 Claims, No Drawings

COMMINUTED MEAT PRODUCT CONTAINING GROUND CHERRIES

This is a continuation-in-part of Ser. No. 08/225,435 filed Apr. 8, 1994, now abandoned, which is a continuation of Ser. No. 07/983,897 filed Dec. 1, 1992, now abandoned.

BACKGROUND OF THE INVENTION

This invention relates to comminuted meat, and more particularly, to a comminuted meat mixture which includes ground meat such as ground beef, and pitted and ground uncooked cherries. The invention also relates to a method of making such a comminuted meat mixture.

While great numbers of people are reported to be making a conscientious effort to restrict their consumption of fat and cholesterol, comminuted meat products remain a principal source of both in many diets. More than seven billion pounds of ground beef are, for example, consumed in the United States each year.

Palatability and acceptance of conventional ground beef and other comminuted meat products are closely related to fat content. As the proportion of fat is reduced in such products, there is a significant diminution of flavor intensity, tenderness and juiciness.

One attempt in recent years to mitigate these effects of fat reduction relied on the addition of water to lean ground beef, together with iota carrageenan and encapsulated salt and spices. Because of loss of water from such a mixture by evaporation, it was noted that it deteriorated quickly after any heating or cooking, by becoming dry and losing flavor, to the extent that the cooked product was unacceptable if held for any length of time under warming lamps or if consumed away from the premises where cooked.

Another attempt to compensate for fat reduction also required the addition of water to lean ground beef, but with the inclusion of substantial amounts of oat bran, spices and seasonings. Lactic acid and beef flavoring were among substances added to compensate for the loss of flavor from the lower fat content. This mixture, too, tends to dry out and lose flavor under heat.

The present inventor has for several years manufactured and sold sausage products enclosed in natural casings and comprising a mixture of ground fresh lean pork, pitted and ground tart cherries, dry milk powder, small amounts of salt and seasoning, and usually, but not always, chopped pecan kernels. The average proportion of cherries in the sausage mixture has been about 18 to 20 percent by weight, whereas the proportion of milk powder has not exceeded about four percent, and the proportion of pecan kernels has not exceeded about five percent.

Unknown to the present inventor until after he had begun the manufacture and sale of such sausage products was an article in *Food Engineering*, October 1986, at page 31, in which a product called "Luau Links" was described as "dinner-sized fresh link sausages with chopped cherries, pineapple, and parsley" and "skinless for easier eating". The ingredients were listed simply as "pork, pineapple, water, cherries, sweet and sour sauce, salt, sodium caseinate, and spices". The article does not provide proportions or measurements, nor does it describe the procedure for preparing such a mixture. The product had never been manufactured commercially or sold to the public, and in this regard it is noted that the present inventor's sausage products were the first cherry-containing meat products to receive label approval from the U.S. Department of Agriculture and the State of Michigan. It can be surmised that one reason why the "Luau Links" product did not reach the market was that the artificial casings employed to render it "skinless" would split promptly upon the application of heat due to the added water as well as the cherries and pineapple. However, this article contains the only prior suggestion by another party within the present inventor's knowledge that cherries (as contrasted with cherry flavoring) might be included in a comminuted meat mixture of any sort.

SUMMARY OF THE INVENTION

The invention provides a comminuted meat mixture free of added water and comprising by weight 100 parts of ground lean meat 10 to 15 parts of pitted and ground uncooked cherries 2 to 3 parts of oat bran, and small but effective amounts of salt and seasoning.

A preferred comminuted meat mixture according to the invention, also free of added water, employs lean beef, about 13.5 parts by weight of the uncooked cherries to 100 parts of the beef, and about 2.4 parts of the oat bran, as well as small but effective amounts of the salt and seasoning.

It has been discovered that a comminuted meat mixture according to the invention achieves several unexpected results in comparison to other known meat mixtures,, especially a low fat meat mixture. Specifically, the meat mixture according to the invention resists lipid oxidation in the refrigerated, frozen and cooked states. Therefore, the meat mixture will resist going rancid such that the shelf life of the meat mixture is increased.

A second unexpected result believed to be tied to the lipid oxidation resistance is the extended shelf life of a cooked meat product made according to the invention. "Warmed over flavor" is a term used to describe the patentability of a cooked food product which is reheated or kept warm for an extended period of time after cooking but before consumption. A meat mixture according to the invention develops an unacceptable warmed over flavor significantly later in time than similar low fat meat mixtures, again extending the shelf life of a cooked product.

It has also been discovered that when a comminuted meat mixture according to the invention is exposed to the heat of cooking, whether on a grill or in a broiler, pan or oven, a seal is immediately formed at its surface, whereby juices and moisture are retained within the mixture throughout cooking, to a much greater degree than might have been expected from experience with conventional comminuted meat mixtures. The seal is so effective that there is little or none of the flareup and spattering that occurs when ordinary meat products are cooked on a grill over burning charcoal, wood or gas.

As a consequence of the seal thus formed at the surface of the mixture, flavor intensity, tenderness and juiciness are enhanced in the cooked product to a great extent over conventional high-fat ground beef mixtures.

Precisely why this phenomenon occurs with the application of heat is not presently understood but is thought to be the result of chemical and physical interaction between the meat, the cherry tissue and the oat bran. In any case, it is thought that the cherry tissue replaces organoleptic and functional characteristics of fat.

Other features, advantages and objects of the invention will be apparent from the ensuing particular description.

THE PREFERRED EMBODIMENT AND METHOD

The preferred embodiment of the invention, and the preferred method for preparing it, begin with 100 parts by weight of beef, preferably about 91 percent lean and comprising fresh cuts from bull carcasses and cow carcasses in about equal amounts; about 13.5 parts by weight of whole individual-quick-frozen cherries which have been pitted prior to freezing and which are preferably of one or more of the red tart varieties; about 2.4 parts of oat bran by weight; about 0.8 part of common salt by weight; and about 0.1 part by weight of seasoning, preferably a mixture of black pepper and white pepper.

In the preferred method, the cherries must be ground in their frozen state, being forced from the grinder through exit apertures preferably ⅛ inch in diameter, so that the ground cherries will comprise small but distinct chunks of tissue or "cherry meat". It is important that finer grinding of the cherries be avoided, because to do so entails the risk that they will liquify to mash or puree form and result in a comminuted meat product of inferior quality.

The lean beef cuts are ground and forced from the grinder through exit apertures of ⅛th inch in diameter. The ground beef base so provided is then placed in a commercial meat mixer, and the ground cherries and other ingredients are added while mixing. The mixer remains energized to blend the ingredients until they are mixed well, that is, thoroughly blended but not overblended. Mixing and blending time to do so is in the range of 45 seconds to 2 minutes, depending upon the size of the mixer.

It is important to note that no water is added in preparing the comminuted meat mixture.

After mixing, the comminuted meat mixture is reground and forced from the grinder through exit apertures of ⅛th inch in diameter. The mixture may then be formed into patties or packaged in bulk packs in conventional manner.

Varieties of red tart cherries are preferred over sweet varieties because they are relatively high in protein, carbohydrates, vitamin A, vitamin C and potassium; but sweet cherries may be substituted if it should become expedient to do so.

The quantity of cherries may be varied from 10 to 15 parts of the comminuted meat mixture by weight. Experience has shown that an unacceptable meat product results when the level of cherries in the mixture is substantially above or below this range. A meat mixture having cherries significantly below 10 parts such as 5 parts, will result in a cooked product which is unacceptably tough and unpalatable, especially a product based upon low fat meat. A meat mixture having cherries significantly above 15 parts, such as 20 parts, will have a cooked consistency which is too loose and is unpalatable. In addition, cherries in this high of an amount will begin to overpower the natural flavor of the meat product which is often unacceptable.

Though a mixture of black and white pepper is the preferred seasoning, other seasonings may be substituted according to taste. (Paprika may be prohibited by local law because it tends to color the comminuted meat. It is preferred that no artificial coloring agent be added to the comminuted meat mixture of the invention regardless of local requirements, since none is needed to provide a fresh-appearing, attractive comminuted meat.)

Product stability in the refrigerated, frozen and cooked states is a function of lipid oxidation. As the naturally occurring lipids in the meat product oxidize, the flavor and color of the meat products will change, eventually becoming rancid. Testing of a meat mixture according to the invention has shown that lipid oxidation is slowed, thereby extending the shelf life of the product. The extended shelf life will reduce waste for meat producers and sellers and increase consumer satisfaction.

Because a meat mixture according to the invention seals itself when exposed to the heat of cooking, as described hereinabove, it remains moister and tastier than conventional ground beef. Equally important, there is much less shrinkage during cooking, whereby the improved mixture provides a higher yield of cooked product, by weight and volume, than can be realized using conventional ground beef mixtures.

Moreover, cooking time is reduced. For example, the cooking time for a two-pound meatloaf is reduced by 15 minutes from the cooking time required for an equivalent amount of conventional ground beef, while the reduction for a quarter-pound burger is approximately 2.5 minutes.

Also because of the seal formed during cooking, and the consequent retention of juices, less cleaning is required after cooking.

Testing has shown that the cherries act as a natural preservative, whereby the comminuted meat mixture of the invention enjoys a longer shelf-life than conventional ground beef mixtures. When kept frozen at zero to ten degrees Fahrenheit, for example, a mixture according to the invention will have a shelf-life of approximately one year.

While the invention has been described in connection with a specific embodiment thereof, it will be understood that this is by way of illustration and not of limitation, and that the scope of the appended claims should be construed as broadly as the prior art will permit.

What is claimed is:

1. A comminuted meat product free of added water and including by weight 100 parts of ground lean meat, 10 to 15 parts of pitted and ground uncooked cherries, 2 to 3 parts of oat bran, and small but effective amounts of common salt and seasoning whereby the cherries extend the shelf life of the product by resisting lipid oxidation and enhance the tenderness and juiciness of the product without overpowering the flavor of the meat.

2. A comminuted meat product according to claim 1, wherein the meat comprises ground beef, the ground beef being at least 80 percent lean.

3. A comminuted meat product according to claim 1, wherein the seasoning comprises a product of black pepper and white pepper.

4. A comminuted meat product according to claim 1, wherein the salt comprises 0.5 to 1.0 part by weight.

5. A comminuted meat product free of added water and comprising by weight 100 parts of ground lean beef, about 13.5 parts of pitted and ground uncooked cherries, about 2.4 parts of oat bran, and small but effective amounts of common salt and seasoning whereby the cherries extend the shelf life of the product by resisting lipid oxidation and enhance the tenderness and juiciness of the product without overpowering the flavor of the meat.

6. A comminuted meat product according to claim 5, wherein the cherries comprise a red tart variety thereof.

7. A comminuted meat product according to claim 5, wherein the beef is 85 to 95 percent lean.

8. A comminuted meat product according to claim 5, wherein the beef is more than 90 percent lean.

9. A comminuted meat product according to claim 5, wherein the beef is about 91 percent lean.

10. A comminuted meat product according to claim 5, wherein the seasoning comprises a product of black pepper and white pepper.

11. A comminuted meat product according to claim 5, wherein the common salt comprises 0.5 to 1.0 part by weight.

* * * * *

UNITED STATES PATENT AND TRADEMARK OFFICE
CERTIFICATE OF CORRECTION

PATENT NO. : 5,503,867
DATED      : April 2, 1996
INVENTOR(S) : Raymond M. Pleva It is certified that error appears in the above-indentified patent and that said Letters Patent is hereby corrected as shown below:

Column 4, claim 3, line 2:
    "product" should be --mixture--.

Column 4, claim 10, line 2:
    "product" should be --mixture--.

Signed and Sealed this

Sixteenth Day of July, 1996

Attest:

BRUCE LEHMAN

Attesting Officer        Commissioner of Patents and Trademarks